United States Patent [19]
Chuang et al.

[11] Patent Number: 5,968,580
[45] Date of Patent: Oct. 19, 1999

[54] ASPARTAME-SWEETENED, ACIDIC, POWERED BEVERAGE MIX

[75] Inventors: Locus Y. Chuang, New City; Rita W. Brander, New Rochelle; Randall R. Jackson, Bronx, all of N.Y.

[73] Assignee: Kraft Foods Inc., Northfield, Ill.

[21] Appl. No.: 08/977,959

[22] Filed: Nov. 25, 1997

[51] Int. Cl.$^6$ .......................... A21D 10/00; A21D 13/00
[52] U.S. Cl. .......................... 426/548; 426/597; 426/599
[58] Field of Search ..................... 426/548, 597, 426/599

[56] References Cited

U.S. PATENT DOCUMENTS

| | | | |
|---|---|---|---|
| 4,497,835 | 2/1985 | A. | 426/76 |
| 4,619,833 | 10/1986 | Anderson | 426/548 |
| 4,741,910 | 5/1988 | Karwowski et al. | 426/285 |
| 5,114,726 | 5/1992 | Tsau et al. | 426/289 |
| 5,139,797 | 8/1992 | Huzinec et al. | 426/3 |
| 5,427,812 | 6/1995 | Hatch et al. | 426/548 |
| 5,582,351 | 12/1996 | Tsau | 241/17 |
| 5,817,351 | 10/1998 | DeWille | 426/74 |

*Primary Examiner*—Nina Bhat
*Attorney, Agent, or Firm*—Thomas R. Savoie; Thomas A. Marcoux

[57] ABSTRACT

As aspartame-sweetened, acidic beverage mix is formulated wherein at least 20% of the aspartame is in bulk (i.e., needle-shaped crystalline particles) form and least 35% of the aspartame is coated onto acid particles. The beverage mix is well suited for powdered, sugar-free, ice tea mixes, particularly fruit-flavored mixes.

11 Claims, No Drawings

ASPARTAME-SWEETENED, ACIDIC, POWERED BEVERAGE MIX

TECHNICAL FIELD

This invention relates to aspartame-sweetened, acidic, powdered beverage mixes, which are readily-soluble in cold water.

It is often difficult to use aspartame, or blends of aspartame and other intensive sweetening agents, in powdered products. For purposes of this application, intensive sweetening agents shall include, but not be limited to, high potency sweeteners such as saccharin, cyclamates, acesulfame-K, trichlorogalactosucrose (TGS, Sucralose), and alitame.

Appearance, chemical and physical instability, potency, and handling and manufacturing difficulties may reduce the applicability of aspartame, particularly in powder form. The lack of utility of aspartame is especially evident when dust-free, free-flowing, fast-dissolving and fast-release requirements are present.

Bulk aspartame is a slow-dissolving, dusty powder made up of needle-shaped, crystalline particles having static and poor flow characteristics. The beverage industry is concerned about waste due to dust and slow dissolution of aspartame. Loss of the aspartame may occur as dust is lost into the air and absorbed onto the surfaces of equipment and containers during manufacturing, transportation, handling, and use.

BACKGROUND ART

As a means for overcoming the problems associated with bulk aspartame a process has been developed to produce a product containing aspartame in combination with citric and/or malic acid. According to this process, aspartame is added to a granulation/mixer, wetted by spraying a measured amount of water and then mixed. Granular citric and/or malic acid is then added and mixed with the wetted aspartame. The mixture is then heated and mixed within a carefully selected temperature range to coat aspartame on the acid particles, and the resulting product is dried. Such a process and product is more fully described in U.S. Pat. No. 5,114,726 of the NutraSweet Company which is hereby incorporated by reference. A suitable material which shall hereafter be referred to as "aspartame-coated acid" is commercially-available from The NutraSweet Company, Deerfield, Ill. under the trademark NUTRASWEET©.

DISCLOSURE OF THE INVENTION

It has been found that for formulating certain beverage mixes, such as soluble, sugar-free, tea-containing, powdered beverage mixes a combination bulk aspartame (i.e., aspartame in needle-shaped captalline form) and aspartame-coated acid is necessary in order to produce a desirable product (i.e., a product that when combined with tap water had a low amount of sediment). Products which were formulated with all of the aspartame included as aspartame-coated acid were found to contain increased amounts of sediment in the reconstituted beverage.

While not wishing to be bound to a particular theory, it is thought the presence of bulk aspartame prevents, or at least reduces, the grinding of tea solids into fine particles during mixing, particularly during high shear mixing. It is well known that fine particles of tea solids cause wetting problems and results in aggregates of the fine tea particles which are difficult to wet and which float on the surface of the intended solution. The bulk aspartame appears to acts as a buffer or sponge during mixing to reduce generation of these fine tea particles.

The presence of aspartame-coated acid slows down the solubility rate of the coated citric acid. This enables the tea solids to dissolve in water before the pH of the solution is fully lowered. It is well known that soluble tea solids have solubility problems in cold, highly-acidic water which is evidenced by the appearance of black specks in the intended tea beverage.

It has also been found that the acid particles contained in the mix should be relatively small and of the size generally classified as fine granular. This is thought to further reduce the grinding of the solids during mixing. A suitable particle size distribution should have at least 50%, preferably at least 60%, of the material by weight passing through a No. 40 U.S. Standard Sieve (opening 420 microns) and being retained on a No. 100 U.S. Standard Sieve (opening 150 microns). This contrasts to typical granular acid wherein over 80% of the material, typically at least 95%, is retained on a No. 40 U.S. Standard Sieve.

According to this invention soluble tea-containing powdered beverage mixes are prepared wherein at least 30% of the aspartame contained in the mix is coated onto acid particles and at least 20% of the aspartame contained the mix is in the form of bulk aspartame. The aspartame-coated acid is usually comprised of 20–50% aspartame and 50–80% citric and/or malic acid.

Unless otherwise indicated, all percents recited in the description and claims of this invention refer to weight percent.

INDUSTRIAL APPLICABILITY

The following description will illustrate the preparation of the preferred products of this invention and will provide the person skilled in the art with the information necessary to make these products as well as variations of them using equivalent materials and methods.

Although applicable to any powdered beverage mix containing both aspartame and soluble tea solids which mix is intended to be dissolved in cold water, this invention is particularly applicable to non-citric (e.g., sweet), fruit-flavored mixes. In order to have well-balanced flavor, aspartame-sweetened, non-citric, fruit-flavored iced tea mixes will generally have aspartame levels and acid levels which are about 20% greater than comparable iced tea mixes which do contain citric flavor (e.g., lemon) or do not contain any added flavor (e.g., unflavored). For fruit flavors, such as raspberry and peach, the sweetness level is increased beyond unflavored or lemon-flavored ice tea mixes in order to meet consumer expectations. Increased sweetness necessitates the use of increased acid in order to provide a balanced flavor.

The bulk aspartame component of the mix consists of white, needle-shaped crystalline particles. At least 80% and preferably at least 95% of the material should pass through a No. 100 U.S. Standard Sieve (openings 150 microns). The mix should contain at least 2%, preferably at least 3%, bulk aspartame. Preferably from 20–45% of the aspartame contained in the mix will be in bulk form. Typically the mix will contain a total aspartame level of 8–16%, preferably about 11–13%.

The aspartame-coated acid will be a white, crystalline powder. The particle distribution of this material, is such that a majority, preferably at least 60% of the material, passes through a No. 40 U.S. Standard Sieve (opening 420 microns) and is retained of a No. 100 U.S. Standard Sieve (opening 150 microns). Most preferably at least 50% of the total material will be retained on a No. 60 U.S. Standard Sieve (opening 250 microns). Preferably 55–80% of the aspartame contained in the mix will be coated onto acid particles. The aspartame-coated acid will typically comprise from 15 to 35%, preferably 20–30% of the beverage mix.

The mix will usually contain at least 10%, preferably 15–25% tea solids. The tea solids contained in the powdered beverage mix will typically be in the form of a spray dried powder comprised of soluble tea solids and a carbohydrate carrier. Maltodextrin is usually employed as the carrier. These spray-dried materials will usually contain about 30–70% tea solids and 30–70% maltodextrin.

In order to obtain a desirable acid taste having a pH of 2.5–3.5, preferably 2.8–3.2, uncoated acid, such as citric and/or malic acid, will usually be present in the beverage mix, as it will be more economical to utilize both coated and uncoated acid, rather than only coated acid having a relatively low level of aspartame coating. The total acid level in the mix will typically be about 30–45%, preferably about 38–40%. As noted above, the uncoated acid should be fine granular in size and preferably will be comparable in particle size distribution to the aspartame-coated acid material. The uncoated acid will typically comprise from 10–30%, preferably 15–25% of the beverage mix.

Additional functional ingredients as are well know to those skilled in the art of powdered beverage mixes may optionally be included. Thus, flavors, flavor enhancers, colors, vitamins, minerals, flow agents, etc. Maybe added to the formulations of this invention.

This invention is further described, but not limited by the following examples:

EXAMPLE 1

| Ingredient | Weight % |
| --- | --- |
| Aspartame-Coated Citric Acid (30/70%) | 28.3 |
| Bulk Aspartame | 3.3 |
| Spray-Dried Tea Solids (50% maltodextrin) | 43.3 |
| Fine Granular Citric Acid | 19.0 |
| Flavors Agents/Color Agents/Flow Agents | 6.1 |

A peach-flavored, powdered ice tea mix was prepared with the above formulation by dry-blending the ingredients in a ribbon blender. 28% of the aspartame was in bulk form and 72% of the aspartame was coated onto citric acid. The powder had a bulk density of about 0.63 g/cc. The powder dissolved well in tap (10° C.) water with 30 seconds of stirring. No black specs were observed and the level of sediment was well within acceptable limits.

EXAMPLE 2

| Ingredient | Weight % |
| --- | --- |
| Aspartame-Coated Citric Acid (30/70%) | 23.6 |
| Bulk Aspartame | 5.1 |
| Spray-Dried Tea Solids (50% maltodextrin) | 40.4 |
| Fine Granular Citric Acid | 22.5 |
| Flavors Agents/Color Agents/Flow Agents | 8.4 |

A raspberry-flavored, powdered ice tea mix was prepared with the above formulation by dry-blending the ingredients in a ribbon blender. 42% of the aspartame was in bulk form and 58% of the aspartame was coated onto citric acid. The powder had a bulk density of about 0.61 g/cc. The powder dissolved well in tap (10C) water with 30 seconds of stirring. No black specs were observed and the level of sediment was within acceptable limits.

Having thus described the invention, what is claimed is:

1. An aspartame-sweetened, acid, powdered beverage mix wherein at least 20% of the aspartame is in bulk form and at least 30% of the aspartame is coated onto acid particles.

2. The beverage mix of claim 1 which also contains at least 10% tea solids.

3. The beverage mix of claim 2 wherein the aspartame-coated acid particles are comprised of 20–50% aspartame and 50–80% acid.

4. The beverage mix of claim 3 wherein the acid is citric and/or malic acid.

5. The beverage mix of claim 2 wherein from 20–45% of the aspartame is in bulk form and 55–80% of the aspartame is coated onto acid particles.

6. The beverage mix of claim 2 which also contains a fruit flavor.

7. The beverage mix of claim 2 wherein a majority of the aspartame-coated acid particles pass through a No. 40 U.S. Standard Sieve and are retained on a No. 100 U.S. Standard Sieve.

8. The beverage mix of claim 2 wherein the total acid level is 30–45%.

9. The beverage mix of claim 2 wherein the total aspartame level is 8–16%.

10. The beverage mix of claim 2 wherein the mix contains at least 2% bulk aspartame.

11. The beverage mix of claim 1 which is sugar-free.

* * * * *